United States Patent [19]

Lands et al.

[11] Patent Number: 6,144,864
[45] Date of Patent: Nov. 7, 2000

[54] VOICE COMMUNICATION FOR HANDHELD COMPUTING DEVICES

[75] Inventors: Robert Michael Lands; An Tuyen Banh, both of Apex, N.C.

[73] Assignee: Ericsson Inc., Research Triangle Park, N.C.

[21] Appl. No.: 09/173,809

[22] Filed: Oct. 16, 1998

[51] Int. Cl.[7] ........................................ H04Q 7/32
[52] U.S. Cl. .................. 455/569; 455/568; 455/566; 455/550; 455/556; 455/557; 455/575; 455/90; 379/428; 379/433; 379/430; 379/431; 379/432; 379/420; 361/683; 361/686
[58] Field of Search ..................... 455/569, 568, 455/566, 550, 556, 557, 575, 90, 403; 379/428, 433, 430, 431, 432, 420; 361/683, 686

[56] References Cited

U.S. PATENT DOCUMENTS 5,224,151  6/1993  Bowen et al. ........................... 455/569
5,448,620  9/1995  Gershkovich et al. .
6,011,686  1/2000  Grasso et al. .......................... 455/556

*Primary Examiner*—Fan Tsang
*Assistant Examiner*—Keith Ferguson
*Attorney, Agent, or Firm*—Wood, Phillips, VanSanten, Clark & Mortimer

[57] ABSTRACT

A handheld voice communication system including a handheld computing device and a handset linked to the computing device via a retractable cable. The handheld computing device includes a data display screen and a microphone integrated therein, and the handset includes a speaker. The handset is movable between a retracted position, wherein at least one portion of the cable is retracted into the computing device and the handset is in contact with the computing device, and an extended position wherein at least one portion of the cable is extended out of the computing device and the handset is spaced away from the computing device. In one embodiment, the speaker is capable of high-level audio output when the handset is in the retracted position and capable of low-level audio output when the handset is in the extended position.

14 Claims, 2 Drawing Sheets

VOICE COMMUNICATION FOR HANDHELD COMPUTING DEVICES

TECHNICAL FIELD

The present invention relates generally to a handheld computing device having voice communications capability. More particularly, the invention relates to a handheld computing device having a retractable handset which may be held close to the ear for the reception of private voice communications or left attached to the computing device for use as the speaker in a speakerphone.

BACKGROUND OF THE INVENTION

Compact, handheld or "palm" computing devices have provided a convenient means for users to store and retrieve data via a portable interface. Such devices typically incorporate a viewable display screen for textual or numerical input or output; an input device such as a small keypad, stylus or touch screen; and a network or modem interface for receiving program data or sharing data with other computers. Because the number of users of handheld computing devices has been steadily increasing, it has become desirable to integrate voice communications capability into these devices to allow users the additional convenience of portable cellular telephones.

Typically, voice communications in handheld and palm computing devices are implemented using several methods, each of which has its own shortcomings. For example, a headset may be used consisting of earphones and a microphone on a common cable attached to the computing device. In such a system, the cable and headset may be a cumbersome and inconvenient accessory to transport and use. Some computing devices include a speaker embedded at one end and a microphone embedded in the other end. The device may be used in the same manner as a conventional telephone handset. However, with such a device, it becomes nearly impossible to use the computing device for voice communications and to simultaneously use the device for data input or retrieval. Still other computing devices include a wired or wireless handset which is capable of both voice transmission and reception. In such devices, however, both the handset and the computing device require high power-consumption transmitters and receivers. Finally, some computing devices incorporate a speakerphone which includes both a speaker for voice reception and a microphone for voice transmission. These devices, however, do not allow the user to engage in private voice communications.

Thus, it is desirable for handheld computing devices to utilize speakerphones for voice communications in order to free the hands for data entry. Voice communication devices that integrate speakerphones can utilize a single speaker as a speakerphone speaker or a private, earpiece speaker. When using a single speaker, however, the user should be protected from the speaker accidentally emitting a sound pressure level associated with a speakerphone when the device is being used as an earpiece for private conversation. Even with a manual switch installed to switch from an earpiece mode to a speakerphone mode, errors in switching could result in considerable discomfort, increased power consumption, and breaches of privacy.

Therefore, there is a need for a handheld computing device that allows the user to conveniently engage in speakerphone and private conversation without the shortcomings described above.

SUMMARY OF THE INVENTION

In one aspect of the present invention, a handheld voice communication system including a handheld computing device is provided. with a handset linked to the computing device via a retractable cable. The handheld computing device includes a data display screen and a microphone integrated therein, and the handset includes a speaker. The handset is movable between a retracted position, wherein the device may be used as a speakerphone, and an extended position, wherein the device may be used as a private listening device. In the retracted position, at least one portion of the cable is retracted into the computing device and the handset is in contact with the computing device. In the extended position, at least one portion of the cable is extending from the computing device and the handset is spaced away from the computing device. In one embodiment, the speaker is capable of high-level audio output when the handset is in the retracted position and capable of low-level audio output when the handset is in the extended position. Thus, the embodiment prevents the handset from producing a high volume-level audio output when the handset is placed close to the ear of the user in a "private listening" mode. Likewise, the handset automatically switches to a higher volume-level speakerphone output when the handset is used as a speakerphone speaker.

Other features of the handheld voice communication system embodying the present invention include means for switching the speaker from a high-level audio output to a low-level audio output automatically when the handset is placed in an extended position. To further facilitate this feature, means may also be provided for detecting whether the cable and handset are in an extended position relative to the computing device. These means can include, for example, mechanical actuators mounted on the computing device.

Still other features of the system embodying the present invention include a high-drive amplifier and a separate low-drive amplifier for driving the handset speaker. The amplifiers may be linked to the detection means to automatically increase the output of the speaker when the cable and handset are in a retracted position. Furthermore, automatic adjustments may be made to the microphone gain based upon the position of the handset and cable in order to increase the gain of the microphone when the system is used as a speakerphone.

The invention may also be embodied in a method of processing audio signals in a handheld computing device. The device used in the method includes a microphone and a visual display integrated therein and a handset having at least one speaker. The handset is movable between a retracted position adjacent the computing device and an extended position spaced away from the computing device. The method includes the steps of detecting the handset in the retracted position via detection means located within the computing device, adjusting the output of the speaker to provide a high-level audio output, detecting the handset in the extended position via the detection means, and adjusting the output of the speaker to provide a low-level audio output.

The present invention may be further embodied in a method of transmitting audio signals. The method includes the steps of providing a handheld computing device having a microphone and a visual display integrated therein. The handset includes at least one speaker linked to the computing device, and is movable between a retracted position adjacent the computing device and an extended position spaced away from the computing device. The handset is next placed in the retracted position, where high-level audio output is received from the speaker. The handset is then removed from the retracted position, and low-level audio output is received from the speaker.

It is to be understood that both the foregoing general description and the following detailed description are exemplary and explanatory and are intended to provide further explanation of the invention as claimed.

BRIEF DESCRIPTION OF THE DRAWINGS

A more complete understanding of the structure and operation of the present invention may be achieved by reference to the following detailed description in conjunction with the accompanying drawings, wherein.

DETAILED DESCRIPTION OF PRESENTLY PREFERRED EXEMPLARY EMBODIMENTS

Figure 1:
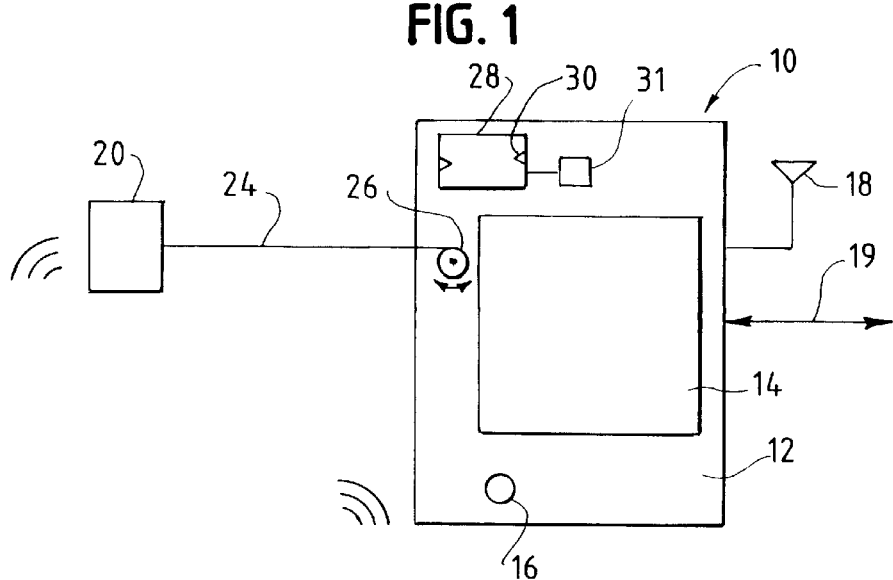
FIG. 1 is a block diagram of a first preferred embodiment of the handheld voice communication device embodying the present invention.
Figure 2:
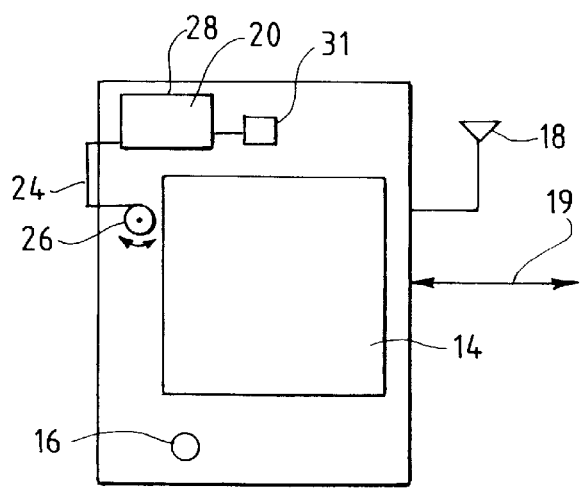
FIG. 2 is a block diagram of the embodiment shown in FIG. 1, illustrating the handset in the retracted position.

In a first preferred embodiment of the invention, FIGS. 1 and 2 illustrate in block form the principal components of the handheld voice communication device 10. The device 10 is preferably integrated into the housing of a handheld or "palm" computing device 12, which may be used to process textual information on a conventional display screen 14 via a stylus or touchpad (not shown). The computing device 12 preferably incorporates a microprocessor (not shown) and memory storage means (not shown) to process and store text-related and graphical information. Examples of presently available palm computing devices include the PalmPilot® series manufactured by 3Com® Corporation.

The computing device 12 also preferably includes an integrated microphone 16 facing outwardly from a front face of the computing device 12. The microphone 16 may be of a conventional type such as a condenser microphone or a piezoelectric pickup unit. The microphone 16 converts a user's voice to electronic audio signals for use in the device 10.

To enable voice communications over either land or through cellular telephony networks, a plurality of links are provided on the computing device 12 as shown in the Figures. In the preferred embodiment, a cellular antenna 18 may be attached to the device 12 to receive and transmit cellular signals to a network. In addition, a wire link 19 may be provided for a landline telephony or other network connection.

A small receiver handset 20 is attached to the computing device 12 via a retractable cable 24. The retractable cable 24 is attached to a spooling device 26 enclosed within the computing device 12. The spooling device 26 includes a biased spool which acts as a retracting means for biasing the handset 20 and cable 24 towards the computing device 12 and retracting the cable 24 into the housing of the computing device 12. The spooling device 26 is preferably ratcheted to lock and prevent retraction when the cable is in one or more extended positions as shown in FIG. 1. The spooling device 26 may comprise, without limitation, a conventional torsional spring-loaded spool, an elastomeric winding or a linear spring.

As shown in FIG. 1, the housing of the computing device 12 includes a cradle 28 for closely receiving and retaining the handset 20 within the device. Preferably, the cradle 28 includes means for detecting when the handset 20 is placed in the cradle 28. In the preferred embodiment, the detection means includes one or more mechanical actuators 30 positioned within the cradle 28 and biased toward the interior of the cradle 28. The actuators 30 may be mechanically connected to a conventional microswitch or a pair of open or closed electrical contacts within the computing device 12. The actuators are linked to internal logic circuitry 31.

When the handset 20 is secured within the cradle 28, the handset 20 and the cable 24 are in a retracted position as shown in FIG. 2. The actuators 30 may be depressed by the handset 20 to either close or open electrical contacts or a microswitch to signal the system 10 via logic 31 that the handset 20 is in the retracted position and within the cradle 28. Alternative detection means also may be utilized within the system 10 to detect the presence of the handset 20 within the cradle, such as a magnetic reed switch, a photosensor, a momentary pushbutton contact or even a switch for manual activation by the user. In the preferred embodiment, when the handset 20 is removed from the cradle 28, the actuators 30 of the detection means will return to their fully biased state, thereby indicating to the system 10 via logic circuitry 31 that the handset 20 is in the extended position spaced apart from the cradle 28 as shown in FIG. 1.

The removable handset 20 allows a user to utilize the system 10 as either a speakerphone or a private listening device. By removing the handset 20 to an extended position spaced from the computing device 12, a user may place the handset 20 close to his or her ear for private conversation. By replacing the handset 20 in the cradle 28 in a retracted position, the user may use the computing device 12 as a hands-free speakerphone with the retracted handset 20 acting as a speakerphone speaker. Because the handset 20 is capable of operating in this dual mode, it is important to prevent the handset 20 from producing a high volume-level audio output when the handset 20 is placed close to the ear of the user. Likewise, it is desirable to have the handset automatically switch to a higher volume-level speakerphone output when the handset 20 is used as a speakerphone speaker. The implementation of these features is discussed below.

Figure 3:
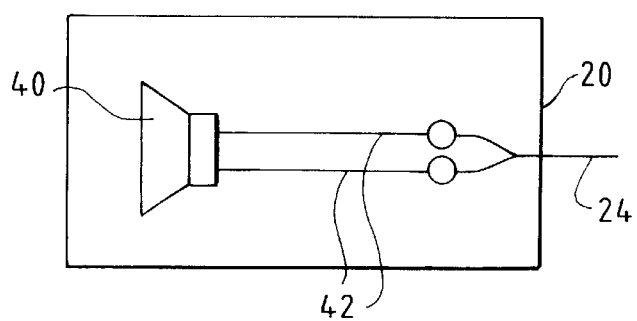
FIG. 3 is a block diagram of the handset shown in FIGS. 1 and 2, embodying the present invention.

FIG. 3 is a block diagram illustrating the main interior components of the handset 20 used in the preferred embodiment of the system 10. As shown in Figure, handset 20 is linked externally via cable 24 to the handheld computing device 12. A main component of the handset 20 is a variable-mode speaker 40 which is capable of producing quality high-level and low-level amplified audio output. Exemplary speakers include those manufactured using piezoelectric technology or conventional paper-diaphragm speakers. Interior wiring 42 passes from said handset 20 through the retractable cable 24 and into the computing device 12.

Figure 4:
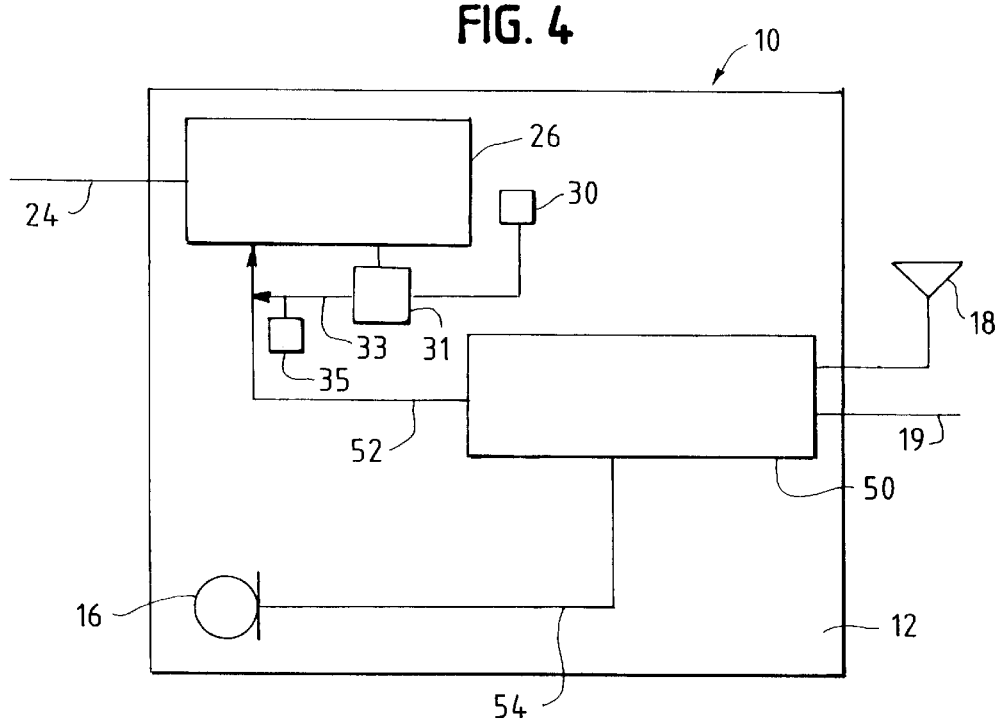
FIG. 4 is a block diagram illustrating the internal components of the handheld voice communication device shown in FIGS. 1 and 2, embodying the present invention.

Turning now to FIG. 4, a block diagram is shown illustrating the principle audio and RF components utilized in the system 10. As shown in the Figure, the retractable cable 24 (ultimately linked to the handset 20) is connected within the computing device 12 via the cable retraction means 26. The retraction means 26 is in turn linked via a received audio downlink line 52 to a telephony interface 50. The interface 50 may comprise cellular transceiver or a landline interface circuitry to interface the system 10 with outside networks. Such circuitry is conventional and well-known in the art. The interface 50 is linkable with antenna 18 or landline wiring 19 externally of the device 12. The transmit uplink from the microphone 16 is communicated to the interface 50 via uplink line 54.

In accordance with the present invention, logic 31 may be linked to either the cradle actuators 30 or the cable retraction device 26 as shown in the FIG. 4. During use, and in conjunction with the method of the present invention, the logic 31 provides a flag based on the position of the cable retraction device 26 and/or the handset 20. The flag may be fed from the logic 31 to the amplifier circuitry 35 via link 33. The amplifier circuitry 35 provides high-level or low-level output to the speaker 40 in the handset 20 via the retractable cable 24. A flag sent by the logic 31 is readable by the amplifier circuitry 35 which preferably adjusts the level of the amplifier output to the speaker 40 in accordance with the position of the handset 20 and/or the cable retraction device 26. In the preferred embodiment, the amplifier output to the speaker 40 is decreased to a low-level output when the handset 20 is removed from the cradle 28 to an extended position, as shown in FIG. 1. Upon replacement of the handset 20 into the cradle 28 to the retracted position as shown in FIG. 2, the logic 31 provides a flag to the amplifier circuitry 35 to increase the output to the speaker 40 to a high level.

The configuration of the preferred embodiment thus allows the volume level of the speaker 40 to be adjusted between a high level to a low level automatically based upon the position of the handset 20 relative to the computing device 12. This protects users from speakerphone sound pressure levels while the device is being used in private listening mode.

In another embodiment of the present invention, the microphone 16 may be linked to a separate microphone amplifier circuit (not shown) to allow automatic adjustment of the microphone gain based on the position of the handset 20 relative to the computing device 12. For example, the microphone gain and the signal level for the uplink 54 may be increased if logic 31 provides a flag to the microphone amplifier circuit. An increase in microphone gain would be desirable during speakerphone use to pick up audio from users that might be distanced from the computing device 12.

Figure 5:
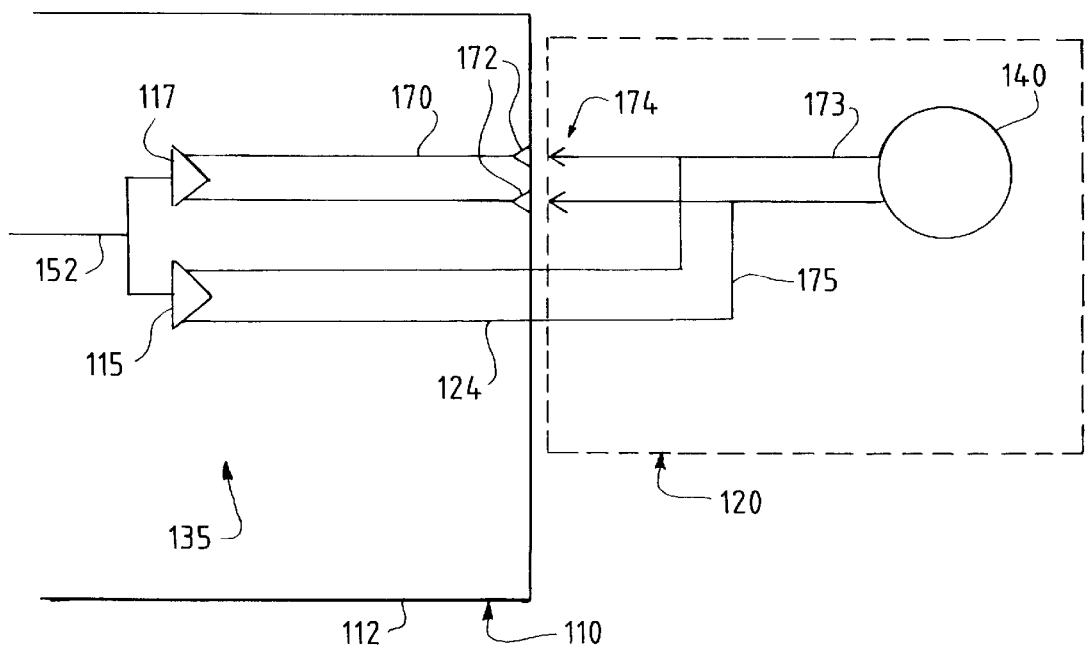
FIG. 5 is a schematic diagram illustrating the audio driver components of a second preferred embodiment of the handheld voice communication device embodying the present invention.

FIG. 5 illustrates a second preferred embodiment of the present invention. The reference numerals used for similar components to those illustrated in FIGS. 1–4 are identical, with one-hundred digits appended thereto. In this embodiment, a high-drive male connector 174 is provided on the handset 120 to provide high-level audio to the speaker 140 when the handset 120 is connected within the cradle of the computing device 112. This embodiment eliminates the need for logic circuits and adjustable amplifier circuitry.

As shown in the Figure, a low-drive amplifier 115 and a separate high-drive amplifier 117 are connected in parallel with audio downlink line 152. Low-power amplifier output is provided from the low-drive amplifier 115 via the retractable cable 124 to the speaker 140 at all times. The speaker 140 within the handset 120 is linked to the retractable cable via links 175 and 173. The speaker 140 is also linked to a pair of high-drive connectors 174 in parallel with links 173 and 175.

The output of the high-drive amplifier 117 is provided via links 170 to connector jacks 172 within the cradle of the computing device 112. When the handset 120 is positioned within the cradle, the high-drive connectors 174 of the handset 120 are received within the jacks 172. This completes an output path from the high-drive amplifier 117 to the speaker 140. The parallel outputs from the high-drive amplifier 117 and the low-drive amplifier 115 thus provide a high-level signal to the speaker 140, resulting in a higher volume level output therefrom. This allows the speaker 140 to provide higher volume to users when the handset 120 is in a retracted position the cradle (speakerphone mode).

Of course, it should be understood that a wide range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. A handheld voice communication system comprising:
   a handheld computing device having a data display screen and a microphone integrated therein, said display screen for relaying visual information to a user;
   a cable connected to said computing device via a retraction means for allowing biased retraction of at least one portion of said cable into said computing device and allowing extension of said at least one portion of said cable out of said computing device; and
   a handset connected to said cable, said handset including a speaker linked to said computing device via said cable, said handset being movable along with said cable from a retracted position wherein at least one portion of said cable is retracted into said computing device and said handset is in contact with said computing device, and an extended position wherein said at least one portion of said cable is extended out of said computing device and said handset is spaced away from said computing device;
   wherein said speaker is capable of high-level audio output when said handset is in said retracted position and capable of low-level audio output when said handset is in said extended position.

2. A handheld voice communication system, as set forth in claim 1, wherein said speaker automatically switches from a high-level audio output to low-level audio output upon movement of said handset from said retracted position.

3. A handheld voice communication system, as set forth in claim 2, further comprising means for switching said speaker from a high-level audio output to a low-level audio output.

4. A handheld voice communication system, as set forth in claim 3, further comprising means for detecting whether said cable is in said retracted position.

5. A handheld voice communication system, as set forth in claim 3, further comprising means for detecting whether said handset is in contact with said computing device.

6. A handheld voice communication system, as set forth in claim 5, further comprising means for detecting whether said cable and said handset are in said extended position.

7. A handheld voice communication system, as set forth in claim 6, further comprising high-drive amplifier means and low-drive amplifier means for driving said speaker, said high-drive amplifier means and said low-drive amplifier means linked to said detecting means, wherein said low-drive amplifier means drives said speaker when said cable and said handset are in said extended position only.

8. A handheld voice communication system, as set forth in claim 5, wherein said computing device defines a cradle for receiving said handset, said handset and said cradle being in said retracted position when said handset is received within said cradle.

9. A handheld voice communication system, as set forth in claim 8, wherein said detecting means further comprises at least one mechanical actuator positioned within said cradle, said actuator being in contact with at least a portion of said handset when said handset is received within said cradle.

10. A handheld voice communication system, as set forth in claim 8, further comprising means for adjusting the gain on said microphone to increase said gain when said cable and said handset are in said retracted position, said means for adjusting gain being linked to said detecting means.

11. A method of processing audio signals in a handheld computing device having a microphone and a visual display integrated therein and a handset having at least one speaker linked to said computing device, said handset being movable between a retracted position adjacent said computing device and an extended position spaced away from said computing device, said method comprising the steps of:

detecting said handset in said retracted position via detection means located within said computing device;

adjusting the output of said speaker to provide a high-level audio output;

detecting said handset in said extended position via said detection means; and adjusting the output of said speaker to provide a low-level audio output;

wherein said steps of adjusting the output of said speaker prevents high-level audio output from said speaker when said speaker is placed close to an ear of a user and allows for high-level audio output when said speaker is placed away from an ear of a user.

12. The method of claim 11 wherein said step of detecting said handset in said extended position further comprises detecting when said handset is not in said retracted position.

13. The method of claim 12 further comprising the step of adjusting the gain of said microphone to increase said gain after said step of detecting said handset in said retracted position.

14. A method of transmitting audio signals including the steps of:

providing a handheld computing device having a microphone and a visual display integrated therein and a handset having at least one speaker linked to said computing device, said handset being movable between a retracted position adjacent said computing device and an extended position spaced away from said computing device;

placing said handset in said retracted position;

receiving a high-level audio output from said speaker;

removing said handset from said retracted position; and receiving a low-level audio output from said speaker;

wherein said handheld computing device automatically switches the output of said speaker between a high-level output to a low-level output based on the position of said speaker relative to said computing device.

* * * * *